(12) United States Patent
Parry (10) Patent No.: US 12,539,972 B2
(45) Date of Patent: Feb. 3, 2026

(54) PASSENGER SUITE ARMREST ASSEMBLY (71) Applicant: Elevate Aircraft Seating LLC, Bothell, WA (US)

(72) Inventor: William Trystan Parry, Bellevue, WA (US)

(73) Assignee: Elevate Aircraft Seating LLC, Bothell, WA (US)

( * ) Notice: Subject to any disclaimer, the term of this patent is extended or adjusted under 35 U.S.C. 154(b) by 0 days.

(21) Appl. No.: 18/660,565

(22) Filed: May 10, 2024

(65) Prior Publication Data

US 2025/0346355 A1   Nov. 13, 2025

(51) Int. Cl.
*B64D 11/06* (2006.01)

(52) U.S. Cl.
CPC ...... *B64D 11/0644* (2014.12); *B64D 11/0602* (2014.12)

(58) Field of Classification Search
CPC ... B64D 11/0602; B64D 11/0644; A47C 7/54; A47C 7/541; A47C 7/543; A47C 20/023
See application file for complete search history.

(56) References Cited

U.S. PATENT DOCUMENTS

| | | | | |
|---|---|---|---|---|
| 8,690,254 | B2 * | 4/2014 | Cailleteau | B64D 11/0646 244/118.6 |
| 2009/0302158 | A1 * | 12/2009 | Darbyshire | B64D 11/0646 244/118.6 |
| 2010/0060065 | A1 * | 3/2010 | Hung | A47C 7/407 297/411.36 |
| 2012/0098318 | A1 * | 4/2012 | Chen | A47C 1/03 297/411.36 |
| 2013/0234486 | A1 * | 9/2013 | Duus | B60N 2/3065 297/311 |
| 2022/0007841 | A1 * | 1/2022 | Chen | A47C 7/541 |
| 2022/0363396 | A1 * | 11/2022 | Rowe | B64D 11/0644 |
| 2024/0327004 | A1 * | 10/2024 | Lopez | B64D 11/0644 |
| 2025/0017375 | A1 * | 1/2025 | Yun | A47C 1/03 |

* cited by examiner

*Primary Examiner* — Joshua J Michener
*Assistant Examiner* — Colin Zohoori
(74) *Attorney, Agent, or Firm* — Yee & Associates, P.C.

(57) ABSTRACT

A passenger suite for an aircraft. The passenger suite includes a seat, a support surface, and a column connected to the support surface. The column extends from a housing at an angle. The support surface, the column, and the housing are associated with the seat. The support surface and the column are movable as whole with respect to the housing between a stowed position and a deployed position. The support surface translates in a direction parallel with a central longitudinal axis of the column and the angle remains constant as the support surface moves between the stowed position and the deployed position.

20 Claims, 6 Drawing Sheets

PASSENGER SUITE ARMREST ASSEMBLY

BACKGROUND INFORMATION

1. Field

The present disclosure relates generally to a passenger suite of an aircraft. More specifically, the present disclosure relates to an articulating armrest assembly for a lie-flat seat of a passenger suite of an aircraft.

2. Background

There has been an industry trend towards installing lie flat seats that are normally associated with wide-body aircraft into narrow-body aircraft. To allow these seats to fit in the narrow-body aircraft, seat manufacturers have needed to increase the installation angle from the forward direction of the aircraft from approximately 30 degrees to approximately 45 degrees, which is considered oblique seating. Additionally, to improve seating density and economics of the aircraft, the increased angle of installation allows the seats to be pitched much closer together (36" pitch on a narrow-body aircraft versus 42" on a wide-body aircraft). Decreasing the pitch also decreases the width of the entryway into the passenger suite.

At a pitch under 42", the passenger suite entry way from the passenger cabin aisle can become tight requiring the armrest of the seat to be in a stowed position to allow a comfortable ingress/egress of the passenger suite. In oblique seating arrangements, a traditional armrest design either rotates upwards or downwards and stows the armrest down low and further back behind the passenger's seat out of the passenger's way. At greater oblique angles, the armrest is required to be so far back that in a deployed position, the armrest is uncomfortable or unreachable for the passenger to use.

Therefore, it would be desirable to have a method and apparatus that takes into account at least some of the issues discussed above, as well as other possible issues.

SUMMARY

An illustrative embodiment of the present disclosure provides an armrest assembly for a seat. The armrest assembly includes a support surface and a column fixedly connected to the support surface. The support surface is movable between a stowed position and a deployed position. The column is extendable from a housing. A plane of the support surface remains horizontal when the support surface is in the stowed position, the deployed position, and when moving between the stowed position and the deployed position. The support surface rises in elevation when moving from the stowed position to the deployed position.

Another illustrative embodiment of the present disclosure provides a passenger suite for an aircraft. The passenger suite includes a seat, a support surface, and a column connected to the support surface. The column extends from a housing at an angle. The support surface, the column, and the housing are associated with the seat. The support surface and the column are movable as whole with respect to the housing between a stowed position and a deployed position. The support surface translates in a direction parallel with a central longitudinal axis of the column and the angle remains constant when the support surface moves between the stowed position and the deployed position.

A further illustrative embodiment of the present disclosure provides a method for deploying an armrest. The armrest assembly is positioned adjacent a seat. A support surface of the armrest assembly is moved relative to a housing of the armrest assembly from a stowed position to deployed position. A plane of the support surface remains horizontal when the support surface is in the stowed position, the deployed position, and when moving between the stowed position and the deployed position. The support surface rises in elevation when moving from the stowed position to the deployed position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that aircraft manufacturers are increasing installation angle of seats to approximately 45 degrees (oblique seating) in order to fit lie-flat seats in narrow-body aircraft.

The illustrative embodiments also recognize and take into account that to improve seating density seats are pitched at 36" on a narrow-body aircraft which also decreases the width of the entryway into the passenger suite.

The illustrative embodiments also recognize and take into account that to accommodate passenger ingress/egress of a passenger suite with oblique seating and 36" pitch, the armrest must have a stowable position that doesn't encroach on the entryway of the passenger suite.

The illustrative embodiments also recognize and take into account that at oblique angles, the armrest is so far back that a standard armrest that rotates upwards or downwards to a deployed position is uncomfortable or unreachable for the passenger to use.

Thus, the illustrative embodiments provide an armrest design comprising a rising, forward extending armrest that can articulate from its aft, stowed position into an upright forward position to allow a comfortable ergonomic seated position.

Figure 1:
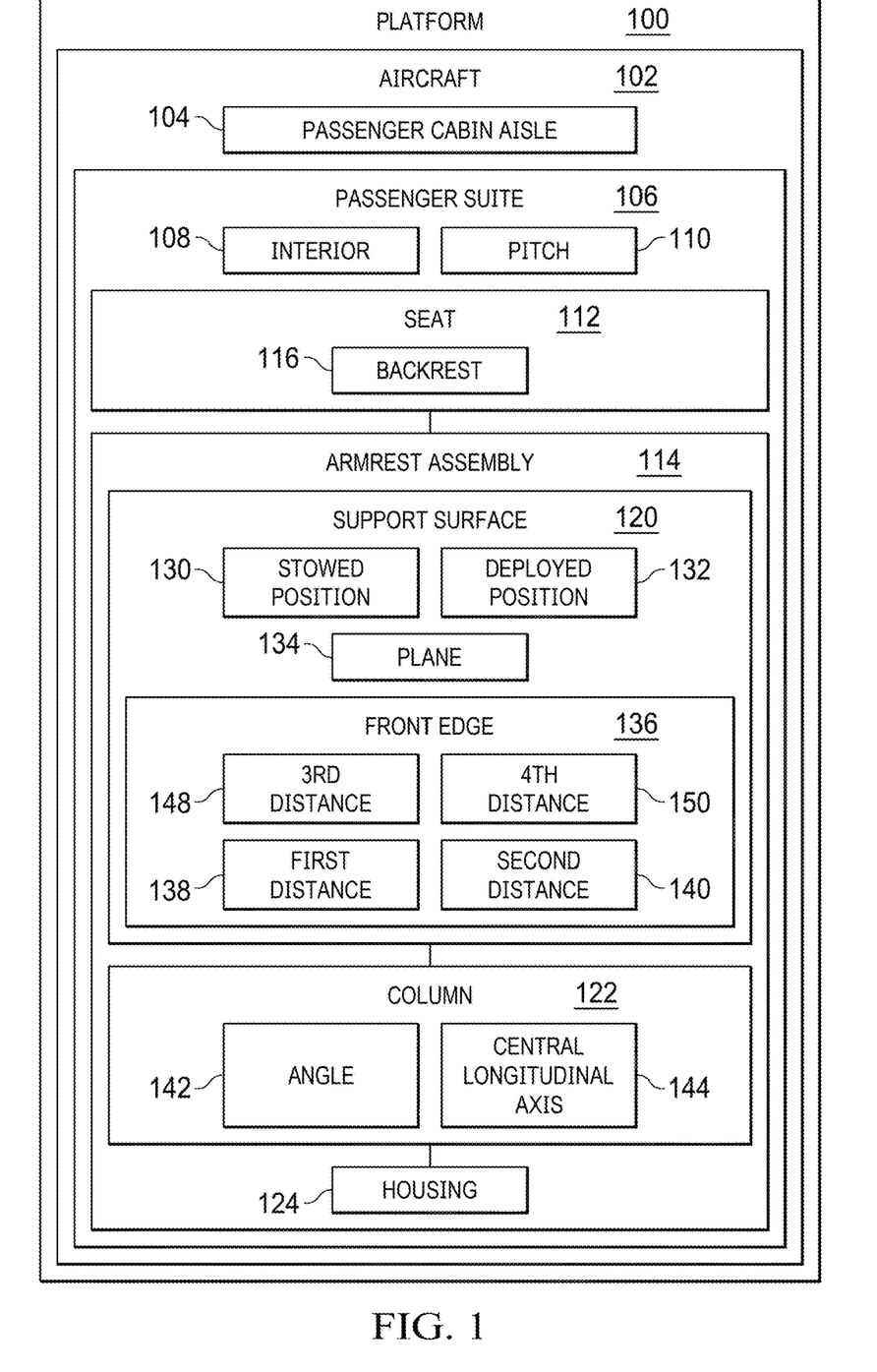
FIG. 1 is an illustration of a block diagram of a platform in accordance with an illustrative embodiment.

With reference now to the figures and, in particular, with reference to FIG. 1, an illustration of a block diagram of a platform is depicted in accordance with an illustrative example. Platform 100 has aircraft 102 in this illustrative example.

The illustration of aircraft 102 in FIG. 1 is not meant to imply physical or architectural limitations to the manner in which an illustrative example may be implemented. For example, although aircraft 102 may be a commercial aircraft, aircraft 102 may be a military aircraft, a rotorcraft, a helicopter, an unmanned aerial vehicle, or any other suitable aircraft that includes an armrest assembly.

Although the illustrative examples are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where an armrest assembly is desirable.

In this illustrative example, platform 100 takes the form of aircraft 102. In this illustrative example, when platform 100 takes the form of aircraft 102, aircraft 102 includes passenger cabin aisle 104 and passenger suite 106. Passenger cabin aisle 104 typically runs longitudinal along the length of aircraft 102 and leads to at least one passenger suite 106.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

Passenger suite 106 includes interior 108, pitch 110, seat 112, and armrest assembly 114.

Seat 112 and armrest assembly 114 are positioned within interior 108 of passenger suite 106. At least one seat 112 and at least one armrest assembly 114 is associated with each passenger suite 106. Further, at least one armrest assembly 114 is associated with each seat 112 within each passenger suite 106. There may be more than one seat 112 and armrest assembly 114 combination included in interior 108 of passenger suite 106. Seat 112 includes backrest 116. Backrest 116 supports a passenger's back in a generally vertical orientation when the passenger sits in seat 112. Passenger suite 106 may include a door that separates interior 108 from passenger cabin aisle 104. Pitch 110 of passenger suite 106 is measured as the distance between the back of passenger suite 106 and the back of another passenger suite positioned in front or behind passenger suite 106 along a line parallel with the direction of passenger travel along passenger cabin aisle 104.

In this illustrative example, armrest assembly 114 includes support surface 120, column 122, and housing 124. Support surface 120 is a generally horizontal surface that supports the arm of a passenger seated in seat 112. Support surface 120 is generally planar and defines plane 134. As a result, plane 134 is oriented generally horizontal. In other words, plane 134 is generally parallel with a floor of passenger suite 106. However, those skilled in the art recognize that generally horizontal may include where plane 134 may be oriented at an angle relative to the floor of the passenger suite 106 in a range of negative 15 to 15 degrees. Further, those skilled in the art recognize that support surface 120 may include a curvature, however plane 134 can still be defined along a line connecting front and back edges of support surface 120.

Support surface 120 has stowed position 130 and deployed position 132. Support surface 120 in deployed position 132 supports the arm of a passenger seated in seat 112. When in stowed position 130, support surface 120 is lowered and recessed from deployed position 132 in order to facilitate ingress/egress of a passenger into and out of interior 108 of passenger suite 106. The orientation of plane 134 remains constant when support surface 120 is in stowed position 130, deployed position 132, and when moving between the two positions. In other words, plane 134 of support surface 120 remains generally horizontal when support surface 120 is in stowed position 130, deployed position 132, and when moving between the two positions.

Support surface 120 includes front edge 136. Front edge 136 is the edge of support surface 120 farthest from backrest 116 of seat 112. When support surface 120 is in stowed position 130, front edge 136 is spaced first distance 138 from another seat positioned in front of seat 112. When support surface 120 is in deployed position 132, front edge 136 is spaced second distance 140 from the seat positioned in front of seat 112. When support surface 120 is in stowed position 130, support surface 120 is lowered and recessed from deployed position 132, thus first distance 138 is greater than second distance 140.

Accordingly, when support surface 120 is in stowed position 130, front edge 136 is spaced third distance 148 from backrest 116 of seat 112. When support surface 120 is in deployed position 132, front edge 136 is spaced fourth distance 150 from backrest 116 of seat 112. When support surface 120 is in deployed position 132, support surface 120 is raised and extended from stowed position 130, thus fourth distance 150 is greater than third distance 148.

Support surface 120 is connected to column 122. Support surface 120 is fixedly connected to column 122 such that support surface 120 does not move relative to column 122. Because support surface 120 is fixedly connected to column 122, plane 134 of support surface 120 remains generally horizontal when support surface 120 is moving between stowed position 130 and deployed position 132.

Housing 124 is mounted to the floor of passenger suite 106. Column 122 is extendable from housing 124. Column 122 extends from housing 124 at angle 142. Angle 142 is a non-square angle. Angle 142 ranges from 10 to 25 degrees. Column 122 extends from housing 124 in a direction parallel with central longitudinal axis 144 of column 122. In other words, support surface 120 translates in a direction along central longitudinal axis 144 of column 122 when support surface 120 moves between stowed position 130 and deployed position 132. Column 122 may comprise a one-piece structure or column 122 may telescopically extend from housing 124.

When support surface 120 is in stowed position 130, column 122 is completely contained within housing 124. When support surface 120 is in stowed position 130, support surface 120 contacts housing 124. When support surface 120 is in stowed position 130, support surface 120 is lockable to housing 124.

Movement of support surface 120 between stowed position 130 and deployed position 132 can be accomplished manually by a passenger seated in seat 112 or by an operator other than the passenger who may not be seated in seat 112. Also, movement of support surface 120 between stowed position 130 and deployed position 132 may be accomplished automatically with a connected motor that is activated by a position of seat 112. For example, once seat 112 recognizes a passenger is seated, support surface 120 may deploy automatically and stow automatically when no passenger is recognized to be seated. Also, for example, support surface 120 may deploy and stow automatically depending on a specific seat position, for example, reclined or upright.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Figure 2:
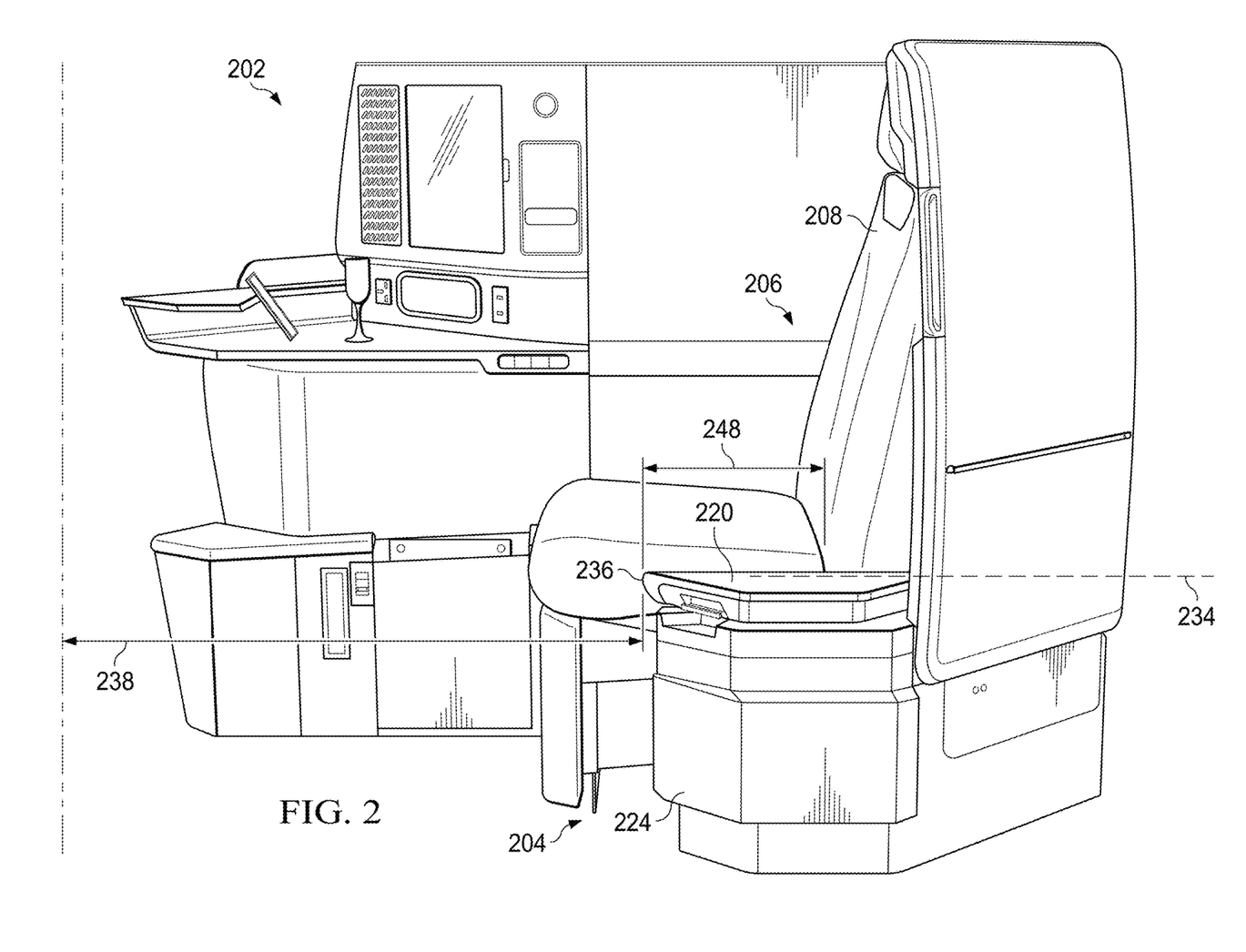
FIG. 2 is an illustration of a passenger suite with an armrest assembly in a stowed position in accordance with an illustrative embodiment.
Figure 3:
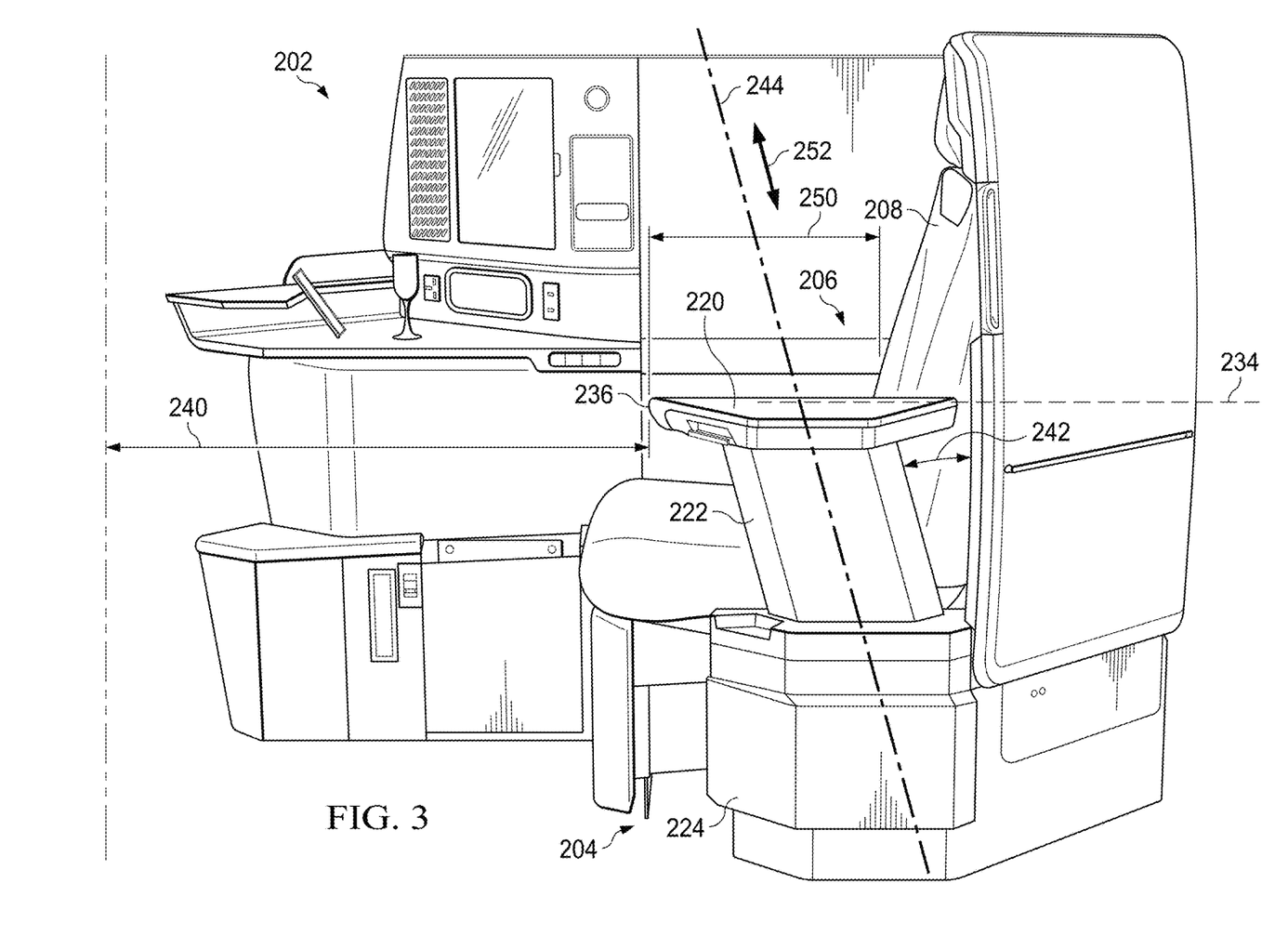
FIG. 3 is an illustration of a passenger suite with an armrest assembly in a deployed position in accordance with an illustrative embodiment.
Figure 4:
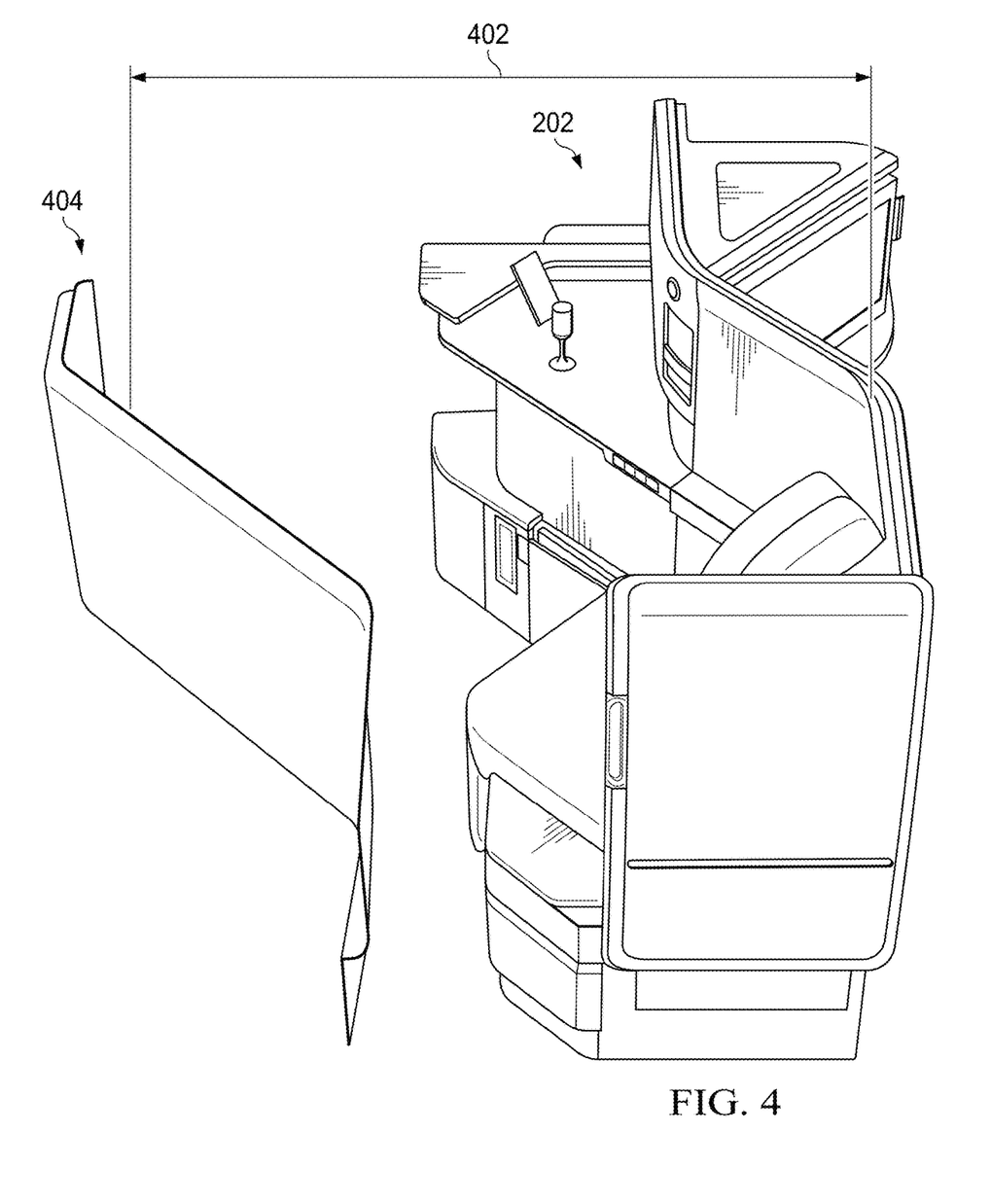
FIG. 4 is an illustration of a passenger suite with an armrest assembly in accordance with an illustrative embodiment.

With reference next to FIGS. 2-4, illustrations of a passenger suite with an armrest assembly are depicted in accordance with an illustrative example. In this illustrative example and the illustrative examples that follow, the same reference numeral may be used in more than one figure. This reuse of a reference numeral in different figures represents the same element in the different figures. FIG. 2 illustrates an armrest assembly in a stowed position while FIG. 3 illustrates an armrest assembly in a deployed position. The components illustrated in FIGS. 2-4 are examples of physical implementations of passenger suite 106 and armrest assembly 114 shown in block form in FIG. 1.

As illustrated passenger suite 202 includes armrest assembly 204 and seat 206. Seat 206 and armrest assembly 204 are positioned within the interior of passenger suite 202. While passenger suite 202 is depicted with only one seat and associated armrest assembly, it is understood that a passenger suite may include more than one seat and armrest assembly combination.

Seat 206 includes backrest 208. Backrest 208 supports a passenger's back in a generally vertical orientation when the passenger sits in seat 206. Pitch 402 of passenger suite 202 (shown in FIG. 4) is measured as the distance between the back of passenger suite 202 and the back of another passenger suite 404 positioned in front or behind passenger suite 202 along a line parallel with the direction of passenger travel along a passenger cabin aisle that leads to passenger suites 202 and 404.

Armrest assembly 204 includes support surface 220, column 222, and housing 224. Support surface 220 is a generally horizontal surface designed to support the arm of a passenger seated in seat 206. Support surface 120 is generally planar and defines plane 234. Plane 234 is oriented generally horizontal and parallel with a floor of passenger suite 202.

When support surface 220 moves from the stowed position shown in FIG. 2 to the deployed position shown in FIG. 3, support surface 220 rises in elevation. In other words, support surface 220 is higher off the floor of passenger suite 202 when in the deployed position that when in the stowed position. As support surface 220 rises in elevation, plane 234 remains horizontally oriented. The orientation of plane 234 remains constant when support surface 220 is in stowed position, deployed position, and when moving between the two positions.

Support surface 220 includes front edge 236. Front edge 236 is the edge of support surface 220 farthest from backrest 208 of seat 206. When support surface 220 is in the stowed position, front edge 236 is spaced first distance 238 from another seat positioned in front of seat 206. When support surface 220 is in the deployed position, front edge 236 is spaced second distance 240 from the seat positioned in front of seat 206. First distance 238 is greater than second distance 240 because as support surface 220 rises to the deployed position, support surface also moves forward because of the angled orientation of column 222.

Accordingly, when support surface 220 is in the stowed position, front edge 236 is spaced third distance 248 from backrest 208 of seat 206. When support surface 220 is in the deployed position, front edge 236 is spaced fourth distance 250 from backrest 208 of seat 206. Fourth distance 250 is greater than third distance 248 because as support surface 220 rises to the deployed position, support surface also moves forward because of the angled orientation of column 222.

Support surface 220 is connected to column 222. Support surface 220 is connected to column 222 such that support surface 220 does not move relative to column 222. Plane 234 of support surface 220 remains generally horizontal when support surface 220 is moving between the stowed position and the deployed position.

Housing 224 is mounted to the floor of passenger suite 202. Column 222 extends from housing 224 at angle 242. Column 222 extends from housing 224 in a direction parallel with central longitudinal axis 244 of column 222. Support surface 220 translates in direction 252 along central longitudinal axis 244 of column 222 when support surface 220 moves between the stowed position and the deployed position. Column 222 may extend from housing 224 as a one-piece or column 222 may telescopically extend from housing 224.

When support surface 220 is in the stowed position, column 222 is completely contained within housing 224.

Support surface 220 contacts housing 224 when in the stowed position. Support surface 220 may be locked to housing 224 when in the stowed position.

An important feature of the illustrative example of armrest assembly 204 is the angled translation of column 222 and thus support surface 220 connected thereto. The angled translation, as opposed to a solely vertical translation, provides for a rising, forward extending support surface when moving from a stowed position to a deployed position. When stowed, the entire armrest assembly is tucked away and does not impede ingress/egress of a passenger into and out of a passenger suite. When deployed, the forward position of the support surface provides a comfortable ergonomic seated position that would not be possible with a solely vertical translation.

The deploying and stowing of support surface 220 may be accomplished manually or automatically based on a position of seat 206.

Figure 5:
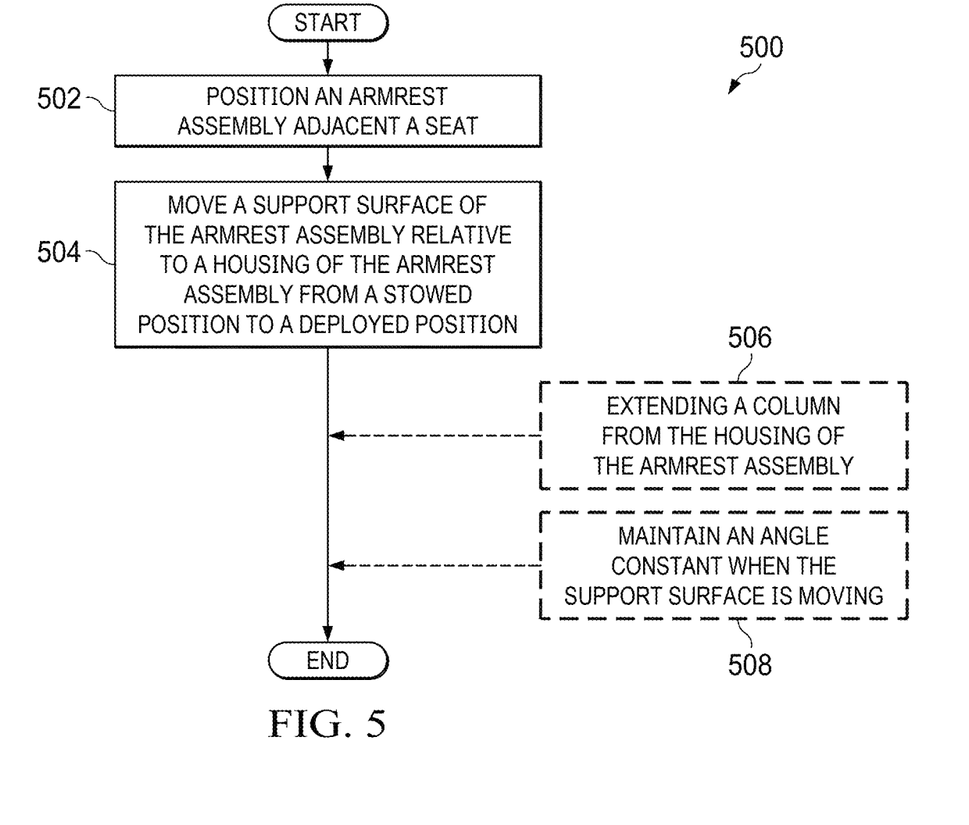
FIG. 5 is an illustration of a flowchart of a process for deploying an armrest in accordance with an illustrative embodiment.

With reference next to FIG. 5, an illustration of a flowchart of a process 500 for deploying an armrest is depicted in accordance with an illustrative example. The method depicted in FIG. 5 may be used in conjunction with the armrest assembly depicted in FIGS. 1-4.

The process begins by positioning an armrest assembly adjacent a seat (operation 502). The seat and the armrest assembly are positioned in the interior of a passenger suite of an aircraft. At least one armrest assembly is associated with each seat of a passenger suite. The process continues by moving a support surface of the armrest assembly relative to a housing of the armrest assembly from a stowed position to deployed position (operation 504). A plane of the support surface remains horizontal when the support surface is in the stowed position, the deployed position, and when moving between the stowed position and the deployed position. The support surface rises in elevation relative to the floor of the passenger suite when moving from the stowed position to the deployed position. A column of the armrest assembly is connected to the support surface such that a central longitudinal axis of the column is at a non-square angle relative vertical. The support surface acts as an armrest. At operation 506, the moving step includes extending the column from a housing of the armrest assembly. At operation 508, during the moving step, the process maintains the angle constant when the support surface is moving between the stowed position and the deployed position. The process ends thereafter.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
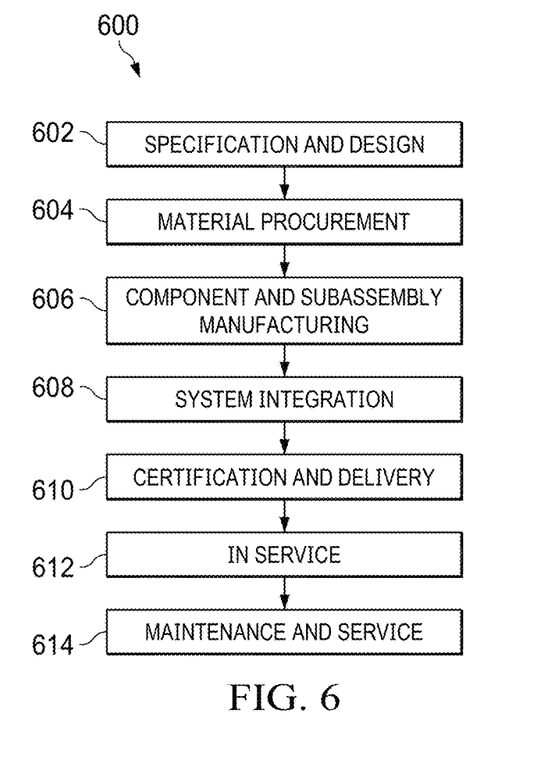
FIG. 6 is an illustration of a block diagram of an aircraft manufacturing and service method in accordance with an illustrative embodiment.
Figure 7:
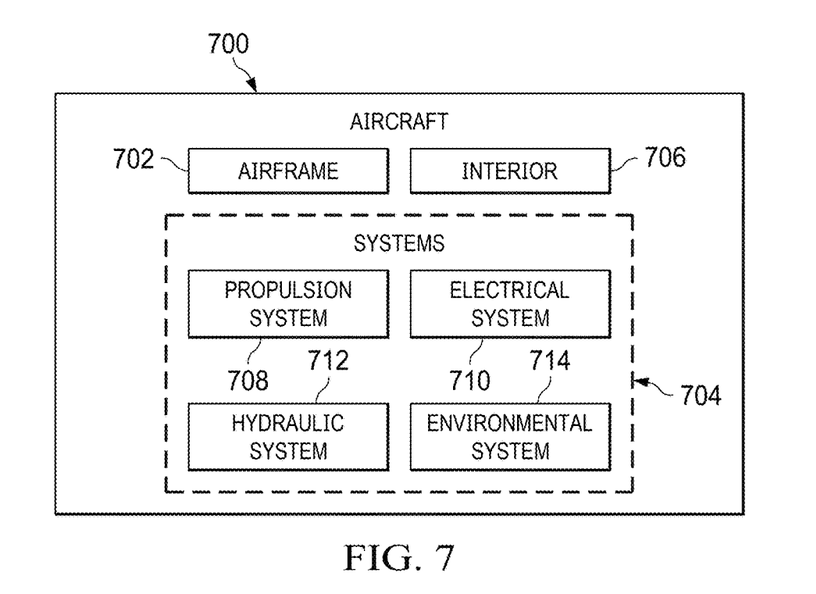
FIG. 7 is an illustration of a block diagram of an aircraft in which an illustrative embodiment may be implemented.

The illustrative embodiments of the disclosure may be further described in the context of aircraft manufacturing and service method 600 as shown in FIG. 6 and aircraft 700 as shown in FIG. 7. Turning first to FIG. 6, an illustration of a block diagram of an aircraft manufacturing and service method is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 in FIG. 7 takes place. Thereafter, aircraft 700 in FIG. 7 may go through certification and delivery 610 in order to be placed in service 612. While in service 612 by a customer, aircraft 700 in FIG. 7 is scheduled for routine maintenance and service 614, which may include modification, reconfiguration, refurbishment, and other maintenance, service, or inspection.

The apparatus of this disclosure may be installed on an aircraft during component and subassembly manufacturing 606. In addition, the apparatus of this disclosure may be retrofitted onto aircraft 700 in FIG. 7 during routine maintenance and service 614 as part of a modification, reconfiguration, or refurbishment of aircraft 700 in FIG. 7.

Each of the processes of aircraft manufacturing and service method 600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 7, an illustration of a block diagram of an aircraft is depicted in which an illustrative embodiment may be implemented. In this example, aircraft 700 is produced by aircraft manufacturing and service method 700 in FIG. 7 and may include airframe 702 with plurality of systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 600 in FIG. 6. In one illustrative example, components or subassemblies produced in component and subassembly manufacturing 606 in FIG. 6 may be fabricated or manufactured in a manner similar to components or subassemblies produced while aircraft 700 is in service 612 in FIG. 6. As yet another example, one or more apparatus embodiments, method embodiments, or a combination thereof may be utilized during production stages, such as component and subassembly manufacturing 606 and system integration 608 in FIG. 6. One or more apparatus embodiments, method embodiments, or a combination thereof may be utilized while aircraft 700 is in service 612, during maintenance and service 614 in FIG. 6, or both. The use of a number of the different illustrative embodiments may substantially expedite the assembly of aircraft 700, reduce the cost of aircraft 700, or both expedite the assembly of aircraft 700 and reduce the cost of aircraft 700.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An armrest assembly for a lie-flat seat of a passenger suite of an aircraft having an approximately 45° oblique seating arrangement, comprising:
 a support surface movable between a stowed position and a deployed position; and
 a column fixedly connected to the support surface at a first non-square angle, the column extendable from a housing, the housing directly mounted to a floor of the passenger suite, the column fixed at a second non-square angle relative to the housing, the second non-square angle supplementary to the first non-square angle;
 wherein a plane of the support surface remains horizontal when the support surface is in the stowed position, the deployed position, and when moving between the stowed position and the deployed position;
 wherein the support surface rises in elevation and extends forward relative to the housing when moving from the stowed position to the deployed position;
 wherein when the support surface is in the stowed position, a front edge of the support surface is spaced a first distance from another seat such that ingress/egress of a passenger into and out of an interior of the passenger suite from an aisle adjacent the armrest assembly is facilitated and when the support surface is in the deployed position, the front edge of the support surface is spaced a second distance from the another seat such that ingress/egress of the passenger into and out of the interior of the passenger suite from the aisle adjacent the armrest assembly is impeded, wherein the first distance is greater than the second distance.

2. The armrest assembly of claim 1, wherein when the support surface is in the stowed position, the column is contained within the housing.

3. The armrest assembly of claim 1, wherein a central longitudinal axis of the column is oriented at the second non-square angle from vertical.

4. The armrest assembly of claim 1, wherein the first non-square angle of the support surface relative to the column is required to remain constant when the support surface is moving between the stowed position and the deployed position.

5. The armrest assembly of claim 1, wherein a central longitudinal axis of the column is oriented at the second non-square angle from vertical and wherein the support surface translates in a direction along the central longitudinal axis of the column when the support surface moves between the stowed position and the deployed position.

6. The armrest assembly of claim 1, further comprising:
 the support surface and the housing positioned adjacent the seat between the seat and an aisle of the aircraft; and
 wherein when the support surface is in the stowed position, a front edge of the support surface is spaced a third distance from a backrest of the seat, and when the support surface is in the deployed position, the front edge of the support surface is spaced a fourth distance from the backrest of the seat, wherein the fourth distance is greater than the third distance.

7. The armrest assembly of claim 1, wherein when the support surface is in the stowed position, the support surface contacts the housing.

8. The armrest assembly of claim 1, wherein when the support surface is in the stowed position, the support surface is lockable to the housing.

9. The armrest assembly of claim 1, wherein the support surface automatically moves between the stowed position and the deployed position based on a position of the seat.

10. A passenger suite for an aircraft having an approximately 45° oblique seating arrangement, comprising:
 a lie-flat seat; and
 an armrest assembly, the armrest assembly comprising:
  a support surface;
  a column fixedly connected to the support surface at a first non-square angle, the column extendable from a housing at a second non-square angle, the second non-square angle supplementary to the first non-square angle, the column fixed at the second non-square angle relative to the housing, wherein the support surface, the column, and the housing are associated with the seat and the housing is directly mounted to a floor of the passenger suite; and
  the support surface and the column movable as a whole with respect to the housing between a stowed position and a deployed position;
 wherein the support surface translates in a direction parallel with a central longitudinal axis of the column and the first and second non-square angles remain constant when the support surface moves between the stowed position and the deployed position;
 wherein when the support surface is in the stowed position, a front edge of the support surface is spaced a first distance from another seat such that ingress/egress of a passenger into and out of an interior of the passenger suite from an aisle adjacent the armrest assembly is facilitated and when the support surface is in the deployed position, the front edge of the support surface is spaced a second distance from the another seat such that ingress/egress of the passenger into and out of the interior of the passenger suite from the aisle adjacent the armrest assembly is impeded, wherein the first distance is greater than the second distance.

11. The passenger suite of claim 10, wherein when the support surface is in the stowed position, the column is contained within the housing.

12. The passenger suite of claim 10, wherein the second non-square angle is defined by the central longitudinal axis of the column relative to vertical.

13. The passenger suite of claim 10, wherein when the support surface is in the stowed position, a front edge of the support surface is spaced a third distance from a backrest of the seat, and when the support surface is in the deployed position, the front edge of the support surface is spaced a fourth distance from the backrest of the seat, wherein the fourth distance is greater than the third distance.

14. The passenger suite of claim 10, wherein when the support surface is in the stowed position, the support surface contacts the housing.

15. The passenger suite of claim 10, wherein when the support surface is in the stowed position, the support surface is lockable to the housing.

16. A method for deploying an armrest for a lie-flat seat of a passenger suite of an aircraft having an approximately 45° oblique seating arrangement, comprising:
 positioning an armrest assembly adjacent a seat; and
 moving a support surface of the armrest assembly relative to a housing of the armrest assembly from a stowed position to a deployed position, the housing directly mounted to a floor of the passenger suite, wherein a column of the armrest assembly is fixedly connected to the support surface at a first non-square angle and the column is fixed at a second non-square angle relative to the housing, the second non-square angle supplementary to the first non-square angle, wherein a plane of the support surface remains horizontal when the support surface is in the stowed position, the deployed position, and when moving between the stowed position and the deployed position and wherein the support surface rises in elevation and extends forward when moving from the stowed position to the deployed position;

wherein when the support surface is in the stowed position, a front edge of the support surface is spaced a first distance from another seat such that ingress/egress of a passenger into and out of an interior of the passenger suite from an aisle adjacent the armrest assembly is facilitated and when the support surface is in the deployed position, the front edge of the support surface is spaced a second distance from the another seat such that ingress/egress of the passenger into and out of the interior of the passenger suite from the aisle adjacent the armrest assembly is impeded, wherein the first distance is greater than the second distance.

17. The method of claim 16, wherein the column of the armrest assembly is connected to the support surface such that a central longitudinal axis of the column is at the second non-square angle relative to vertical and wherein the moving the support surface comprises extending the column from the housing of the armrest assembly in a direction parallel with the central longitudinal axis of the column.

18. The method of claim 17, wherein the moving the support surface comprises maintaining the first non-square angle constant between the support surface and the column when the support surface is moving between the stowed position and the deployed position.

19. The method of claim 16, wherein the moving the support surface is accomplished manually by an occupant of the seat.

20. The method of claim 16, wherein the moving the support surface is accomplished automatically in response to an occupant of the seat adjusting a position of the seat.

* * * * *